(12) United States Patent
Abughazaleh et al.

(10) Patent No.: US 8,608,982 B1
(45) Date of Patent: Dec. 17, 2013

(54) RECYCLING ORGANIC COMPOUNDS FROM GASIFIER SYNGAS CONDENSATE

(75) Inventors: John Abughazaleh, Sugar Land, TX (US); Siva Ariyapadi, Pearland, TX (US); David P. Mann, Katy, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 22 days.

(21) Appl. No.: 13/558,114

(22) Filed: Jul. 25, 2012

(51) Int. Cl.
*C01B 3/38* (2006.01)
*C01B 3/24* (2006.01)

(52) U.S. Cl.
USPC .......................................... 252/373; 423/650

(58) Field of Classification Search
USPC ........................................................ 252/373
See application file for complete search history.

(56) References Cited

U.S. PATENT DOCUMENTS

| | | |
|---|---|---|
| 6,610,112 B1 | 8/2003 | Klock et al. |
| 2009/0019767 A1 | 1/2009 | Abughazaleh et al. |
| 2009/0152208 A1 | 6/2009 | Agrawal |
| 2009/0152209 A1 | 6/2009 | Agrawal |
| 2010/0172819 A1 | 7/2010 | Wallace et al. |

*Primary Examiner* — Melvin C Mayes
*Assistant Examiner* — Kenneth Vaden
(74) *Attorney, Agent, or Firm* — Gary M. Machetta

(57) ABSTRACT

Systems and methods for producing a synthetic gas are provided. A feedstock can be gasified within a gasifier to produce a raw syngas. The raw syngas can be processed within a processing device to produce a processed syngas. The processed syngas can be separated into a vapor phase, an organic phase, and an aqueous phase within a separator. The organic phase can be introduced to the gasifier. The aqueous phase can be introduced to a stripper to provide steam and a condensate, and the steam can then be introduced to the gasifier.

17 Claims, 3 Drawing Sheets

RECYCLING ORGANIC COMPOUNDS FROM GASIFIER SYNGAS CONDENSATE

BACKGROUND

1. Field

Embodiments described herein generally relate to the gasification process. More particularly, such embodiments relate to recycling organic compounds produced during the gasification process.

2. Description of the Related Art

Gasification is a high-temperature process that converts carbon-containing feedstocks into mostly gaseous mixtures, including carbon monoxide, carbon dioxide, hydrogen, and methane. These gaseous mixtures are typically referred to as synthesis gas or, more succinctly, syngas. Syngas can be used as a source of hydrogen, for the production of other organic chemicals, and/or to generate steam and/or electricity.

In addition to carbon monoxide, carbon dioxide, hydrogen, and methane, the gasification process also produces undesirable organic compounds, such as alkanes, benzene, toluene, xylene, and naphthalenes. As the syngas is cooled, the organic compounds tend to condense out of the syngas into a water effluent, thereby creating a waste water. In many gasification processes, however, it is not commercially viable to recover the organic compounds in the waste water.

There is a need, therefore, for an improved system and method for recovering and recycling the organic compounds produced in the gasification process.

DETAILED DESCRIPTION

Systems and methods for producing a synthetic gas are provided. A feedstock can be gasified within a gasifier to produce a raw syngas. The raw syngas can be processed within a processing device to produce a processed syngas. The processed syngas can be separated into a vapor phase, an organic phase, and an aqueous phase within a separator. The organic phase can be introduced to the gasifier. The aqueous phase can be introduced to a stripper where steam removes much of the organics from the aqueous phase, and the contaminated steam can then be introduced to the gasifier. The stripped aqueous phase (condensate) can be recycled.

Figure 1:
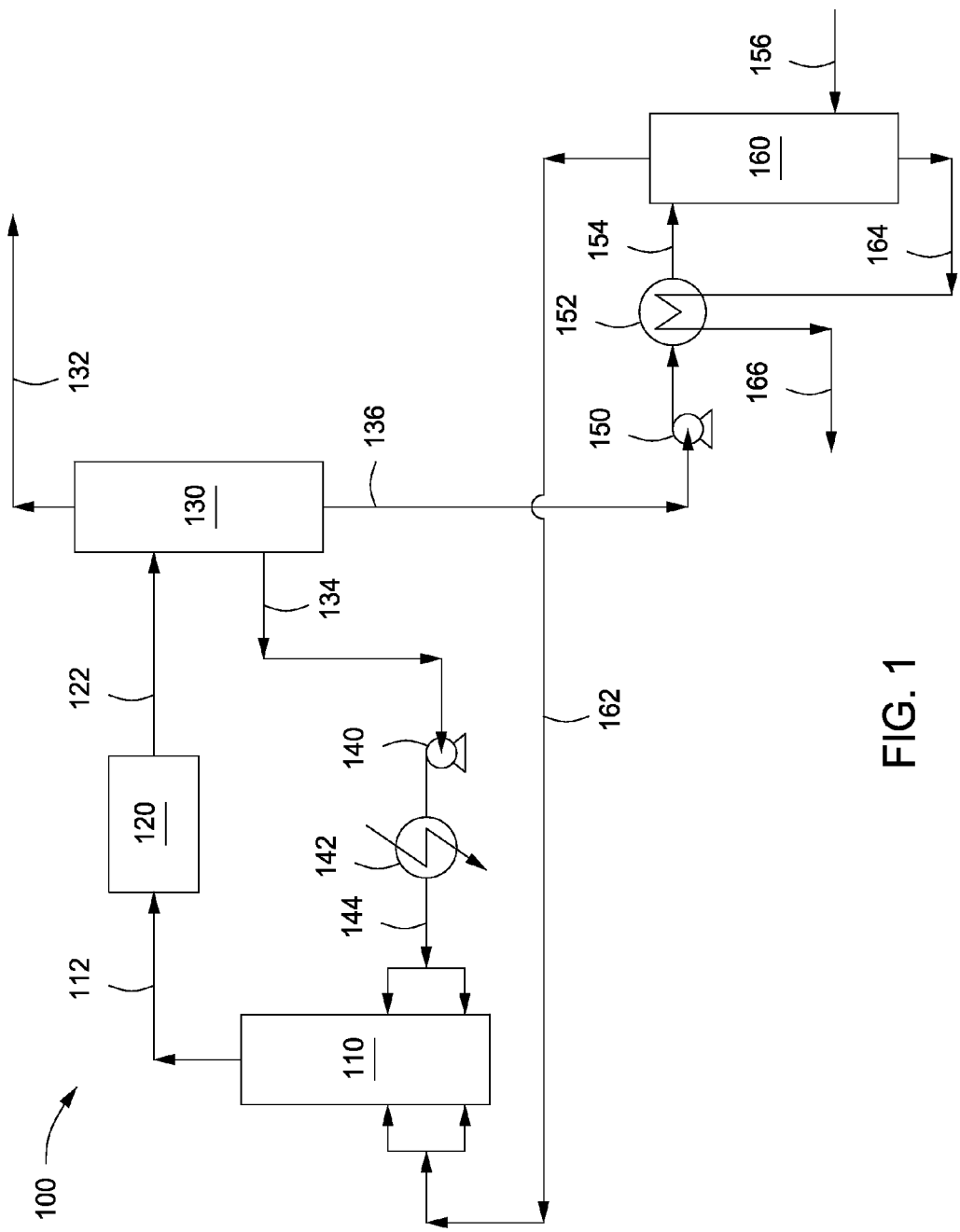
FIG. 1 depicts an illustrative gasification system, according to one or more embodiments described.

FIG. 1 depicts an illustrative gasification system 100, according to one or more embodiments. The gasification system 100 can include a gasifier 110, a syngas processing device 120, a separator 130, and a stripper 160. The gasifier 110 can gasify a carbonaceous feedstock in the presence of an oxidant and steam to produce a raw syntheses gas or syngas via line 112. The raw syngas via line 112 can exit the gasifier 110 at a temperature ranging from about 575° C. to about 1500° C. For example, the raw syngas in line 112 can have a temperature ranging from a low of about 600° C., about 900° C., about 1,000° C., or about 1,100° C. to a high of about 1,200° C., about 1,300° C., about 1,400° C., or about 1,500° C.

The raw syngas in line 112 exiting the gasifier 110 can include, but is not limited to, hydrogen, carbon monoxide, carbon dioxide, methane, nitrogen, argon, or any combination thereof. The raw syngas in line 112 can have a hydrogen content ranging from a low of about 20 mol %, about 45 mol %, or about 50 mol % to a high of about 60 mol %, about 70 mol %, or about 80 mol %. The raw syngas in line 112 can have a carbon monoxide content ranging from a low of about 15 mol %, about 17 mol %, or about 19 mol % to a high of about 20 mol %, about 30 mol %, or about 40 mol %. The raw syngas in line 112 can have a carbon dioxide content ranging from a low of about 0 mol %, about 5 mol %, or about 10 mol % to about 20 mol %, about 30 mol %, or about 40 mol %. The raw syngas in line 112 can be have a methane content ranging from a low of about 0 mol %, about 2 mol %, or about 3 mol % to a high of about 5 mol %, about 8 mol %, or about 10 mol %. For example, the raw syngas in line 112 can have a methane content from about 1 mol % to about 5 mol %, about 2 mol % to about 8 mol %, about 4 mol % to about 9 mol %, or about 6 mol % to about 10 mol %. The raw syngas in line 112 can have a nitrogen content ranging from a low of about 1 mol %, about 2 mol %, or about 3 mol % to a high of about 5 mol %, about 40 mol %, or about 50 mol %. The raw syngas in line 112 can have an argon content ranging from a low of about 0.1 mol %, about 0.3 mol %, or about 1 mol % to a high of about 1 mol %, about 1.5 mol %, or about 3 mol %.

The raw syngas in line 112 can also include undesirable organic compounds or "contaminants" including, but not limited to, benzene, toluene, xylene, naphthalenes, oxygen-substituted one and two-ring aromatics, phenol, phenanthracene, ethane, ethylene, propane, and the like. The raw syngas in line 112 can have a contaminant content ranging from a low of about 100 ppmv, about 200 ppmv, or about 500 ppmv to a high of about 1,000 ppmv, about 2,000 ppmv, or about 5,000 ppmv.

The raw syngas via line 112 can be introduced to the syngas processing device 120. The syngas processing device 120 can be adapted to remove particulates from the raw syngas, increase the moisture content of the raw syngas, convert carbon monoxide in the raw syngas to carbon dioxide, and/or cool the raw syngas to provide a processed syngas via line 122, as explained in more detail in FIG. 3. The processed syngas via line 122 can have a hydrogen content ranging from a low of about 10 mol % to a high of about 99 mol %. The processed syngas via line 122 can have a carbon monoxide content ranging from a low of about 0.2 mol % to a high of about 40 mol %. The processed syngas via line 122 can have a carbon dioxide content ranging from a low of about 0.01 mol % to a high of about 50 mol %. The processed syngas via line 122 can have a methane content ranging from a low of about 0.5 mol % to a high of about 15 mol %. The processed syngas via line 122 can have a nitrogen content ranging from a low of about 0.1 mot % to a high of about 60 mol %. The processed syngas via line 122 can have an argon content ranging from a low of about 0.1 mol % to a high of about 3 mol %. The processed syngas via line 122 can have a contaminant content ranging from a low of about 50 ppmv, about 100 ppmv, or about 500 ppmv to a high of about 1,000 ppmv, about 2,000 ppmv, or about 4,000 ppmv.

The processed syngas via line 122 can be introduced to the separator 130. The separator 130 can be a decanter, a centrifuge, or the like. For example, the separator 130 can be a three phase separator. The separator 130 can be adapted to separate the processed syngas via line 122 into a gaseous or vapor phase via line 132, a hydrocarbon or organic phase via line 134, and a liquid or aqueous phase via line 136.

The vapor phase via line 132 can have a temperature ranging from a low of about 4° C. to a high of about 300° C. The vapor phase via line 132 can have a pressure ranging from a low of about 200 kPa to a high of about 6,000 kPa.

The vapor phase via line 132 can have a hydrogen content ranging from a low of about 10 mol % to a high of about 99 mol %. The vapor phase via line 132 can have a carbon monoxide content ranging from a low of about 0.2 mol % to a high of about 40 mol %. The vapor phase via line 132 can have a carbon dioxide content ranging from a low of about 0.05 mol % to a high of about 50 mol %. The vapor phase via line 132 can have a methane content ranging from a low of about 0.5 mol % to a high of about 15 mol %. The vapor phase via line 132 can have a nitrogen content ranging from a low of about 0.1 mol % to a high of about 60 mol %. The vapor phase via line 132 can have an argon content ranging from a low of about 0.1 mol % to a high of about 3 mol %. The vapor phase via line 132 can have a contaminant content ranging from a low of about 20 ppmv, about 50 ppmv, or about 100 ppmv to a high of about 500 ppmv, about 1000 ppmv, or about 2000 ppmv.

The organic phase via line 134 can have a temperature ranging from a low of about 4° C. to a high of about 300° C. The organic phase via line 134 can have a pressure ranging from a low of about 200 kPa to a high of about 6,000 kPa.

The organic phase via line 134 can have a hydrogen content ranging from a low of about 0.01 mol % to a high of about 1 mol %. The organic phase via line 134 can have a carbon monoxide content ranging from a low of about 0.01 mol % to a high of about 1 mol %. The organic phase via line 134 can have a carbon dioxide content ranging from a low of about 0.01 mol % to a high of about 1 mol %. The organic phase via line 134 can have a methane content ranging from a low of about 0.01 mol % to a high of about 2 mol %. The organic phase via line 134 can have a nitrogen content ranging from a low of about 0.01 mol % to a high of about 1 mol %. The organic phase via line 134 can have an argon content ranging from a low of about 0.001 mol % to a high of about 1 mol %. The organic phase via line 134 can have a contaminant content ranging from a low of about 40 mol %, about 50 mol %, or about 60 mol % to a high of about 80 mol %, about 90 mol %, or about 99 mol %.

The organic phase via line 134 can have a C1-C12 hydrocarbon content ranging from a low of about 40 mol % to a high of about 99 mol %. For example, the organic phase via line 134 can have a C1 hydrocarbon content ranging from a low of about 0.01 mol % to a high of about 0.5 mol %, a C2-C5 hydrocarbon content ranging from a low of about 0.1 mol % to a high of about 25 mol %, and a C6-C12 hydrocarbon content ranging from a low of about 5 mol % to a high of about 95 mol %.

The aqueous phase via line 136 can have a temperature ranging from a low of about 4° C. to a high of about 300° C. The aqueous phase via line 136 can have a pressure ranging from a low of about 200 kPa to a high of about 6,000 kPa.

The aqueous phase via line 136 can have a hydrogen content ranging from a low of about 0.001 mol % to a high of about 0.5 mol %. The aqueous phase via line 136 can have a carbon monoxide content ranging from a low of about 0.001 mol % to a high of about 0.5 mol %. The aqueous phase via line 136 can have a carbon dioxide content ranging from a low of about 0.01 mol % to a high of about 2 mol %. The aqueous phase via line 136 can have a methane content ranging from a low of about 0.001 mol % to a high of about 0.5 mol %. The aqueous phase via line 136 can have a nitrogen content ranging from a low of about 0.001 mol % to a high of about 0.5 mol %. The aqueous phase via line 136 can have an argon content ranging from a low of about 0.001 mol % to a high of about 0.05 mol %. The aqueous phase via line 136 can have a contaminant content ranging from a low of about 0.1 mol % about 0.5 mol %, or about 1 mol % to a high of about 5 mol %, about 10 mol %, or about 20 mol %.

The organic phase via line 134 can be introduced to a pump 140 and a heat exchanger or vaporizer 142 to provide a vaporized organic phase via line 144 that can be introduced (or recycled back) to the gasifier 110. For example, the vaporized organic phase via line 144 can be introduced into a lower and/or upper mixing zone in the gasifier 110, as explained in more detail in FIG. 2. The vaporized organic phase via line 144 can have a temperature ranging from a low of about 100° C. to a high of about 500° C. The vaporized organic phase via line 144 can have a pressure ranging from a low of about 250 kPa to a high of about 6,100 kPa.

The aqueous phase via line 136 can be introduced to a pump 150 and a heat exchanger 152 to provide a heated compressed aqueous phase via line 154 that can be introduced to the stripper 160, which can be, for example, a condensate stripper. Alternatively, the entire multi-phase stream 122 can be sent to the stripper 160. The heated compressed aqueous phase via line 154 can have a temperature ranging from a low of about 100° C. to a high of about 400° C. The heated compressed aqueous phase via line 154 can have a pressure ranging from a low of about 300 kPa to a high of about 6,400 kPa.

A heat transfer or stripping medium, e.g., steam, via line 156 can be introduced to the stripper 160 at a pressure ranging from a low of about 3,500 kPa, about 3,700 kPa, or about 3,900 kPa to a high of about 4,800 kPa, about 5,000 kPa, or about 6,400 kPa. For example, the heat transfer medium can have a pressure ranging from about 3,500 kPa to about 5,200 kPa, about 3,900 kPa to about 4,800 kPa, about 4,100 kPa to about 4,500 kPa, or about 4,200 kPa to about 4,400 kPa.

The contaminants can be dissolved or suspended in the aqueous phase fed into the stripper 160. A majority of the contaminants can be stripped from the aqueous phase and output in steam ("contaminant steam") via line 162. The stripper 160 can also output a condensate, e.g., water, via line 164. The contaminant steam via line 162 can have a hydrogen content ranging from a low of about 0.001 mol % to a high of about 0.5 mol %. The contaminant steam via line 162 can have a carbon monoxide content ranging from a low of about 0.001 mol % to a high of about 0.5 mol %. The contaminant steam via line 162 can have a carbon dioxide content ranging from a low of about 0.01 mol % to a high of about 5 mol %. The contaminant steam via line 162 can have a methane content ranging from a low of about 0.001 mol % to a high of about 0.5 mol %. The contaminant steam via line 162 can have a nitrogen content ranging from a low of about 0.001 mol % to a high of about 0.5 mol %. The contaminant steam via line 162 can have an argon content ranging from a low of about 0.0001 mol % to a high of about 0.1 mol %. The contaminant steam via line 162 can have a contaminant content ranging from a low of about 0.01 mol %, about 0.1 mol %, or about 1 mol % to a high of about 5 mol %, about 10 mol %, or about 20 mol %.

Thus, greater than about 5 mol %, about 10 mol %, about 20 mol % about 30 mol %, or more of the contaminants present in the raw syngas via line 112 and/or the processed syngas via line 122 can be recycled back to the gasifier 110 via the organic phase in line 144. Further, greater than about 5 mol %, about 10 mol %, about 20 mol % about 30 mol %, or more of the contaminants present in the raw syngas via line 112 and/or the processed syngas via line 122 can be recycled back to the gasifier 110 via the contaminate steam in line 162.

The contaminant steam via line 162 can be introduced into the gasifier 110. For example, the contaminant steam via line 162 can be introduced into the lower and/or upper mixing zone of the gasifier 110 to serve as a diluting or quenching medium. The contaminant steam via line 162 can have a pressure similar to the pressure in the lower and/or upper mixing zones in the gasifier 110. For example, the contaminant steam via line 162 can have a pressure ranging from a low of about 300 kPa, about 600 kPa, about 1,000 kPa, or about 3,000 kPa to a high of about 5,000 kPa, about 5,500 kPa, about 6,000 kPa, or about 6,400 kPa.

The contaminant steam via line 162 can supply a portion of the steam required by the gasifier 110, and thus, there is no energy or steam penalty associated with steam stripping in the stripper 160. Further, the method of recycling the contaminants back to the gasifier 110 via lines 144, 162 is relatively insensitive to the amount of contaminants formed, whereas the cost of other conventional methods, such as chemical or biological treatment of the waste, is relatively proportional to the amount of contaminants to be removed.

The condensate via line 164 can have a hydrogen content ranging from a low of about 0.0001 mol % to a high of about 0.01 mol %. The condensate via line 164 can have a carbon monoxide content ranging from a low of about 0.0001 mol % to a high of about 0.01 mol %. The condensate via line 164 can have a carbon dioxide content ranging from a low of about 0.01 mol % to a high of about 0.2 mol %. The condensate via line 164 can have a methane content ranging from a low of about 0.0001 mol % to a high of about 0.01 mol %. The condensate via line 164 can have a nitrogen content ranging from a low of about 0.0001 mol % to a high of about 0.01 mol %. The condensate via line 164 can have an argon content ranging from a low of about 0.0001 mol % to a high of about 0.01 mol %. The condensate via line 164 can have a contaminant content ranging from a low of about 0.1 mol %, about 0.5 mol %, or about 1 mol % to a high of about 2 mol %, about 5 mol %, or about 10 mol %.

The condensate via line 164 can exchange heat with the aqueous phase via line 136 in the heat exchanger 152 to provide a cooled condensate via line 166. The cooled condensate via line 166 can be introduced to a saturator (see FIG. 3) within the syngas processing device 120 or to one or more other devices within the gasification system 100, i.e., to battery limit.

Figure 2:
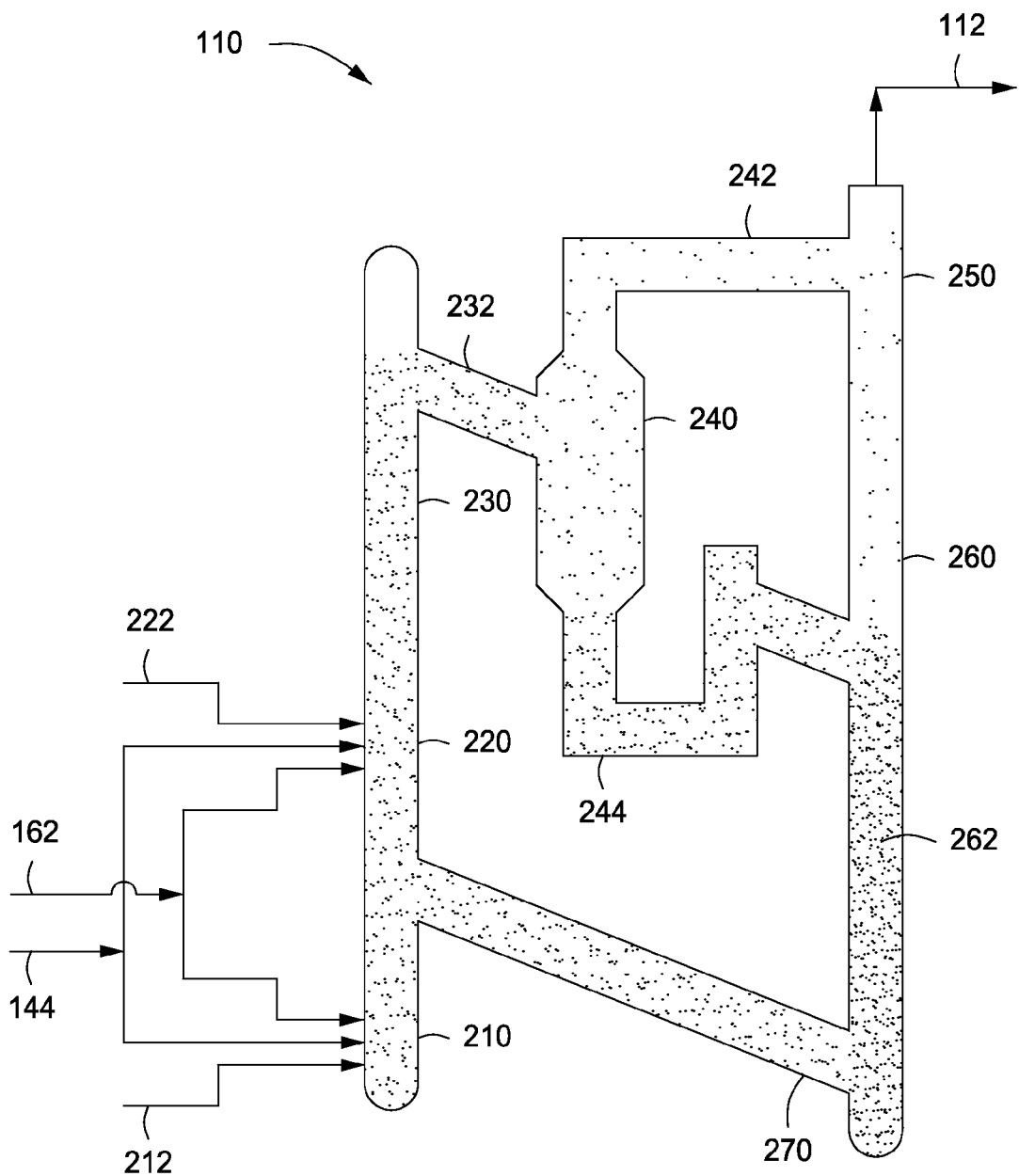
FIG. 2 depicts an illustrative gasifier from FIG. 1, according to one or more embodiments described.

FIG. 2 depicts an illustrative gasifier 110 from FIG. 1, according to one or more embodiments. The gasifier can include a first, lower mixing zone 210, a second, upper mixing zone 220, a gasification zone 230, one or more disengagers 240, 250, and a standpipe 260.

One or more feedstocks via line 222 can be introduced to the first mixing zone 210, the second mixing zone 220, and/or the gasification zone 230. One or more oxidants via line 212 can be introduced to the first mixing zone 210, the second mixing zone 220, and/or the gasification zone 230. The organics phase via line 144 (see FIG. 1) can be introduced to the first mixing zone 210, the second mixing zone 220, and/or the gasification zone 230. The contaminate steam via line 162 (see FIG. 1) can be introduced to the first mixing zone 210, the second mixing zone 220, and/or the gasification zone 230.

At least a portion of the organics phase via line 144 can be injected, sprayed, or atomized directly into the first and/or second mixing zone 210, 220 through dedicated nozzles. At least a portion of the organics phase via line 144 can be injected, sprayed, or atomized into another feed stream (not shown), such as the feedstock via line 222, the oxidant via line 212, or the contaminate steam via line 162, prior to being introduced to the first and/or second mixing zone 210, 220. Likewise, at least a portion of the contaminate steam via line 162 can be injected, sprayed, or atomized directly into the first and/or second mixing zone 210, 220 through dedicated nozzles. At least a portion of the contaminate steam via line 162 can be injected, sprayed, or atomized into another feed stream (not shown), such as the feedstock via line 222, the oxidant via line 212, or the organics phase via line 144, prior to being introduced to the first and/or second mixing zone 210, 220.

The contaminants in the organics phase via line 144 and/or the contaminate steam via line 162 introduced to the first mixing zone 210 can be at least partially destroyed primarily by combustion with oxygen. The contaminants in the organics phase via line 144 and/or the contaminate steam via line 162 introduced to the second mixing zone 220 can be cracked and/or gasified with the feedstock. Destroying the contaminants in lines 144, 162 in the gasifier 110 can eliminate the need for potentially costly disposal or destruction by, for example, incineration. Further, the carbon and hydrogen content of the contaminants in lines 144, 162 can be recovered as product hydrogen and carbon monoxide, i.e., syngas, by being re-gasified in the gasifier 110. This can improve the overall efficiency of the gasifier 110.

As used herein, the term "feedstock" refers to one or more raw materials, whether solid, liquid, gas, or any combination thereof. For example, the feedstock can include one or more carbonaceous materials. Examples of a suitable carbonaceous materials can include, but are not limited to, biomass (i.e., plant and/or animal matter or plant and/or animal derived matter); coal (high-sodium and low-sodium lignite, lignite, subbituminous, and/or anthracite, for example); oil shale; coke; tar; asphaltenes; low ash or no ash polymers; hydrocarbons, hydrocarbon-based polymeric materials; biomass derived material; or by-product derived from manufacturing operations. Examples of suitable hydrocarbon-based polymeric materials can include, but are not limited to, thermoplastics, elastomers, rubbers, including polypropylenes, polyethylenes, polystyrenes, including other polyolefins, homo polymers, copolymers, block copolymers, and blends thereof; PET (polyethylene terephthalate), poly blends, polyhydrocarbons containing oxygen; heavy hydrocarbon sludge and bottoms products from petroleum refineries and petrochemical plants such as hydrocarbon waxes; blends thereof, derivatives thereof, and combinations thereof.

The feedstock in line 222 can include a mixture or combination of two or more carbonaceous materials (i.e., carbon-containing materials). The feedstock in line 222 can include a mixture or combination of two or more low ash or no ash polymers, biomass derived materials, or by-products derived from manufacturing operations. The feedstock in line 222 can include one or more carbonaceous materials combined with one or more discarded consumer products, for example, carpet and/or plastic automotive parts/components including bumpers and dashboards. Such discarded consumer products can be reduced in size to fit within the gasifier 110. Accordingly, the systems and methods discussed and described herein can be useful for accommodating mandates for proper disposal of previously manufactured materials.

The particular type and/or amount of oxidant introduced via 212 to the gasifier 110 can influence the composition and/or physical properties of the syngas and hence, the downstream products made therefrom. Illustrative oxidants can include, but are not limited to, air, oxygen, essentially oxygen, oxygen-enriched air, mixtures of oxygen and air, mixtures of oxygen and one or more other gases such as syngas, mixtures of oxygen and one or more inert gases, for example, nitrogen and/or argon. The oxidant in lines 212 can contain about 60 vol % oxygen or more, about 70 vol % oxygen or more, about 80 vol % oxygen or more, about 90 vol % oxygen or more, about 95 vol % oxygen or more, or about 99 vol % volume oxygen or more. As used herein, the term "essentially oxygen" refers to an oxygen stream containing more than 50 vol % oxygen. As used herein, the term "oxygen-enriched air" refers to a gas mixture containing about 21 vol % to 50 vol % oxygen. Oxygen-enriched air and/or essentially oxygen can be obtained, for example, from cryogenic distillation of air, pressure swing adsorption, membrane separation, or any combination thereof. The oxidant in line 212 can be nitrogen-free or essentially nitrogen-free. As used herein, the term "essentially nitrogen-free" refers to an oxidant that contains about 5 vol % nitrogen or less, about 4 vol % nitrogen or less, about 3 vol % nitrogen or less, about 2 vol % nitrogen or less, or about 1 vol % nitrogen or less.

The first mixing zone 210, the second mixing zone 220, and/or the gasification zone 230 can have a pressure ranging from a low of about 2,800 kPa, about 3,000 kPa, or about 3,200 kPa to a high of about 5,000 kPa, about 5,200 kPa, or about 6,100 kPa. For example, the first mixing zone 210, the second mixing zone 220, and/or the gasification zone 230 can have a pressure ranging between about 2,800 kPa to about 4,200 kPa, about 3,200 kPa to about 6,100 kPa, or about 3,400 kPa to about 3,800 kPa.

The feedstock via line 222 can be gasified in the presence of the oxidant via line 212 and the steam via line 162 to produce a syngas/particulate mixture. The syngas/particulate mixture can be recovered from the gasification zone 230 and introduced to a first disengager or cyclone 240 via a first line or crossover 232. The first cyclone 240 can be adapted to separate at least a portion of the particulates from the syngas. The separated syngas ("first syngas stream") can flow out the first cyclone 240 and be introduced to a second cyclone 250 via a second line or crossover 242. The separated particulates ("first particulate stream") can flow out of the first cyclone 240 and be introduced to the standpipe 260 via a transfer line or seal leg 244.

The second cyclone 250 can be adapted to separate at least a portion of the remaining particulates from the first syngas stream via line 242. The separated syngas ("second syngas stream" or "raw syngas") can then flow out of the second cyclone 250 via line 112 (see FIG. 1). The separated particulates ("second particulate stream") can flow out of the second cyclone 250 and be introduced to the standpipe 260 along with the first particulate stream via line 244 from the first cyclone 240. The particulates from the first and second cyclones 240, 250 can accumulate within the standpipe 260 and form a bed of particulates or "solids bed" 262 therein. The particulates can be transferred via a recycle line or j-leg 270 from the standpipe 260 to the first mixing zone 240 and/or the second mixing zone 220.

Figure 3:
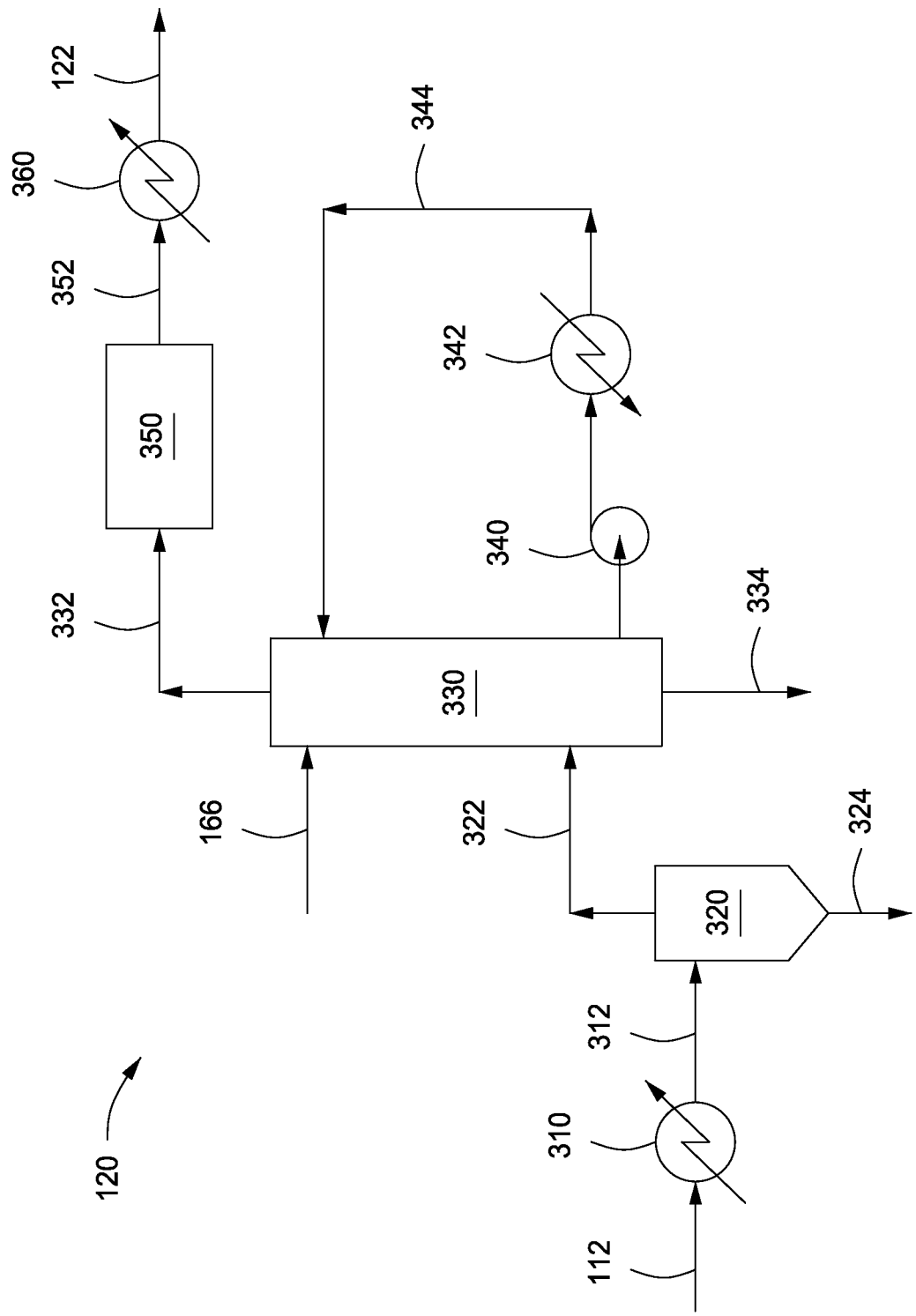
FIG. 3 depicts an illustrative syngas processing device from FIG. 1, according to one or more embodiments described.

FIG. 3 depicts an illustrative syngas processing device 120 from FIG. 1, according to one or more embodiments. The syngas processing device 120 can include one or more heat exchangers or coolers 310, 342, 360, a particulate removal device 320, a saturator 330, and a gas shift device 350. The raw syngas via line 112 from the gasifier 110 (see FIGS. 1 and 2) can be introduced to the syngas cooler 310 to provide a cooled raw syngas via line 312. The cooled raw syngas via line 312 can be introduced to the particulate removal device 320.

The particulate control device 320 can include one or more separation devices, such as high temperature particulate filters. The particulate control device 320 can provide a filtered syngas via line 322 with a particulate concentration below the detectable limit of about 0.1 ppmw. An illustrative particulate control device can include, but is not limited to, sintered metal filters (for example, iron aluminide filter material), metal filter candles, and/or ceramic filter candles. The particulate control device 320 can eliminate the need for a water scrubber due to the efficacy of removing particulates from the syngas. The elimination of a water scrubber can allow for the elimination of dirty water or grey water systems, which can reduce the process water consumption and associated waste water discharge. The solid particulates can be purged from the system via line 324, or they can be recycled to the gasifier 110 (not shown). The filtered syngas via line 322 can be introduced to the saturator 330.

The saturator 330 can be used to increase the moisture content of the filtered syngas in line 322. Condensate generated by other devices in the SNG system 300 can be introduced to the saturator 330. For example, the condensate via line 166 from the stripper 160 (see FIG. 1) can be introduced to the saturator 330 and utilized as a saturation water. This can reduce both the emission of contaminated water from the system 100 and the requirement for adding make-up water, e.g., boiler feed water, to the system 100. However, if needed, make-up water (not shown), such as demineralized water, can also be introduced to the saturator 330 to maintain a proper water balance. The saturator 330 can include a circulation pump 340 and a heat exchanger 342 having a fluid, such as water, flowing therethrough in line 344. The saturator can output a saturated syngas via line 332 and blow down water via line 334. The saturated syngas via line 332 can be introduced to the gas shift device 350.

The gas shift device 350 can include a system of parallel single-stage or two-stage gas shift catalytic beds. The saturated syngas in line 332 can be preheated before entering the gas shift device 350. The gas shift device 350 can be used to convert the saturated syngas via line 332 to a shifted syngas via line 352. The gas shift device 350 can include one or more shift converters or reactors to adjust the hydrogen to carbon monoxide ratio of the syngas by converting carbon monoxide to carbon dioxide and hydrogen. The gas shift device 350 can include, but is not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof.

A cobalt-molybdenum catalyst can be incorporated into the gas shift device 350. The cobalt-molybdenum catalyst can operate at a temperature of about 290° C. in the presence of hydrogen sulfide, such as about 100 ppmw hydrogen sulfide. If the cobalt-molybdenum catalyst is used to perform a sour shift, subsequent downstream removal of sulfur can be accomplished using any sulfur removal method and/or technique.

The gas shift device 350 can include two reactors arranged in series. A first reactor can be operated at high temperature of from about 260° C. to about 400° C. to convert a majority of the carbon monoxide present in the saturated syngas in line 332 to carbon dioxide at a relatively high reaction rate using a catalyst which can be, but is not limited to, copper-zinc-aluminum, iron oxide, zinc ferrite, magnetite, chromium oxides, derivatives thereof, or any combination thereof. A second reactor can be operated at a relatively low temperature of about 150° C. to about 200° C. to maximize the conversion of carbon monoxide to carbon dioxide and hydrogen. The second reactor can use a catalyst that includes, but is not limited to, copper, zinc, copper promoted chromium, derivatives thereof, or any combination thereof. The gas shift device 350 can recover heat from the shifted syngas. The recovered heat can be used to preheat the saturated syngas in line 332 before it enters the gas shift device 350.

The shifted gas via line 352 can be introduced to the heat exchanger 360 to provide the processed syngas via line 122

(see FIG. 1). The processed syngas via line 122 can have a temperature ranging from a low of about 100° C. to a high of about 300° C. The processed syngas via line 122 can have a pressure ranging from a low of about 200 kPa to a high of about 5,900 kPa.

Embodiments described herein further relate to any one or more of the following paragraphs:

1. A method for producing a synthetic gas, comprising: gasifying a feedstock within a gasifier to produce a raw syngas; processing the raw syngas within a processing device to produce a processed syngas; separating the processed syngas into a vapor phase, an organic phase, and an aqueous phase within a separator; introducing the organic phase to the gasifier; introducing the aqueous phase to a stripper to provide steam and a condensate; and introducing the steam into the gasifier.

2. The method of paragraph 1, wherein the processed syngas comprises contaminants including at least one of benzene, toluene, xylene, naphthalenes, oxygen-substituted one and two-ring aromatics, phenol, phenanthracene, ethane, ethylene, and propane.

3. The method of paragraph 2, wherein greater than about 40 mol % of the contaminants present in the processed syngas are recycled back to the gasifier via the organic phase and the steam.

4. The method according to any one of paragraphs 1 to 3, further comprising introducing a heat transfer medium to the stripper, wherein the heat transfer medium has a pressure between about 4,100 kPa and about 4,500 kPa.

5. The method according to any one of paragraphs 1 to 4, wherein the steam has a pressure between about 3,400 kPa and about 3,800 kPa.

6. The method of paragraph 5, wherein a mixing zone in the gasifier where at least one of the organic phase and the steam is introduced has a pressure between about 3,400 kPa and about 3,800 kPa.

7. The method according to any one of paragraphs 1 to 6, further comprising: vaporizing the organic phrase to provide a vaporized organic phase; and introducing the vaporized organic phase to the gasifier.

8. The method according to any one of paragraphs 1 to 7, wherein processing the raw syngas further comprises: removing particulates from the raw syngas with a particulate control device to provide a filtered syngas; increasing a moisture content of the filtered syngas with a saturator to provide a saturated syngas; and converting carbon monoxide in the saturated gas into carbon dioxide with a gas shift device to provide the processed syngas.

9. The method of paragraph 8, further comprising introducing at least a portion of the condensate to the saturator.

10. A method for producing a synthetic gas, comprising: gasifying a feedstock within a gasifier to produce a raw syngas; processing the raw syngas within a processing device to produce a processed syngas, wherein the processed syngas comprises contaminants; separating the processed syngas into a vapor phase, an organic phase, and an aqueous phase within a separator, wherein the organic phase and the aqueous phase each include at least a portion of the contaminants; introducing the organic phase to the gasifier; stripping at least a portion of the contaminants from the aqueous phase in the presence of a heat transfer medium within a stripper to provide a contaminant steam and a condensate, wherein the heat transfer medium has a pressure between about 3,900 kPa to about 4,800 kPa; and introducing the contaminant steam to the gasifier.

11. The method of paragraph 10, wherein the contaminants comprise at least one of benzene, toluene, xylene, naphthalenes, oxygen-substituted one and two-ring aromatics, phenol, phenanthracene, ethane, ethylene, and propane.

12. The method of paragraph 10 or 11, wherein the processed syngas has a contaminant content between about 50 ppmv and about 4,000 ppmv.

13. The method according to any one of paragraphs 10 to 12, wherein the organic phase has a contaminant content between about 40 mol % and about 99 mol %.

14. The method according to any one of paragraphs 10 to 13, wherein the aqueous phase has a contaminant content between about 0.1 mol % and about 20 mol %.

15. The method according to any one of paragraphs 10 to 14, wherein the contaminant steam has a contaminant content between about 0.1 mol % and about 20 mol %.

16. The method according to any one of paragraphs 10 to 15, wherein the condensate has a contaminant content between about 0.1 mol % and about 10 mol %.

17. The method according to any one of paragraphs 10 to 16, wherein greater than about 40 mol % of the contaminants present in the processed syngas are recycled back to the gasifier via the organic phase and the contaminant steam.

18. A system for producing a synthetic gas, comprising: a gasifier adapted to gasify a feedstock to provide a raw syngas; a processing device coupled to the gasifier and adapted to convert the raw syngas into a processed syngas, wherein the processed syngas comprises contaminants; a separator coupled to the processing device and adapted to separate the processed syngas into a vapor phase, an organic phase, and an aqueous phase, wherein the organic phase and the aqueous phase each comprise at least a portion of the contaminants, and wherein the organic phase is introduced to the gasifier; and a stripper coupled to the separator and adapted to strip at least a portion of the contaminants from the aqueous phase in the presence of a heat transfer medium to provide contaminant steam and a condensate, wherein the contaminant steam is introduced to the gasifier.

19. The system of paragraph 18, further comprising a vaporizer coupled to the separator and the gasifier and adapted to vaporize the organic phase prior to introducing the organic phase to the gasifier.

20. The system of paragraph 18 or 19, wherein the processing device comprises a saturator, and wherein the condensate is introduced to the saturator.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for producing a synthetic gas, comprising:
gasifying a feedstock within a gasifier to produce a raw syngas;
processing the raw syngas within a processing device to produce a processed syngas;
separating the processed syngas into a vapor phase, an organic phase, and an aqueous phase within a separator;
introducing the organic phase to the gasifier;
introducing the aqueous phase to a stripper to provide steam and a condensate; and
introducing the steam into the gasifier.

2. The method of claim 1, wherein the processed syngas comprises contaminants including at least one of benzene, toluene, xylene, naphthalenes, oxygen-substituted one and two-ring aromatics, phenol, phenanthracene, ethane, ethylene, and propane.

3. The method of claim 2, wherein greater than about 40 mol % of the contaminants present in the processed syngas are recycled back to the gasifier via the organic phase and the steam.

4. The method of claim 1, further comprising introducing a heat transfer medium to the stripper, wherein the heat transfer medium has a pressure between about 4,100 kPa and about 4,500 kPa.

5. The method of claim 1, wherein the steam has a pressure between about 3,400 kPa and about 3,800 kPa.

6. The method of claim 5, wherein a mixing zone in the gasifier where at least one of the organic phase and the steam is introduced has a pressure between about 3,400 kPa and about 3,800 kPa.

7. The method of claim 1, further comprising:
vaporizing the organic phrase to provide a vaporized organic phase; and
introducing the vaporized organic phase to the gasifier.

8. The method of claim 1, wherein processing the raw syngas further comprises:
removing particulates from the raw syngas with a particulate control device to provide a filtered syngas;
increasing a moisture content of the filtered syngas with a saturator to provide a saturated syngas; and
converting carbon monoxide in the saturated gas into carbon dioxide with a gas shift device to provide the processed syngas.

9. The method of claim 8, further comprising introducing at least a portion of the condensate to the saturator.

10. A method for producing a synthetic gas, comprising;
gasifying a feedstock within a gasifier to produce a raw syngas;
processing the raw syngas within a processing device to produce a processed syngas, wherein the processed syngas comprises contaminants;
separating the processed syngas into a vapor phase, an organic phase, and an aqueous phase within a separator, wherein the organic phase and the aqueous phase each include at least a portion of the contaminants;
introducing the organic phase to the gasifier;
stripping at least a portion of the contaminants from the aqueous phase in the presence of a heat transfer medium within a stripper to provide a contaminant steam and a condensate, wherein the heat transfer medium has a pressure between about 3,900 kPa to about 4,800 kPa; and
introducing the contaminant steam to the gasifier.

11. The method of claim 10, wherein the contaminants comprise at least one of benzene, toluene, xylene, naphthalenes, oxygen-substituted one and two-ring aromatics, phenol, phenanthracene, ethane, ethylene, and propane.

12. The method of claim 10, wherein the processed syngas has a contaminant content between about 50 ppmv and about 4,000 ppmv.

13. The method of claim 10, wherein the organic phase has a contaminant content between about 40 mol % and about 99 mol %.

14. The method of claim 10, wherein the aqueous phase has a contaminant content between about 0.1 mol % and about 20 mol %.

15. The method of claim 10, wherein the contaminant steam has a contaminant content between about 0.1 mol % and about 20 mol %.

16. The method of claim 10, wherein the condensate has a contaminant content between about 0.1 mol % and about 10 mol %.

17. The method of claim 1, wherein greater than about 40 mol % of the contaminants present in the processed syngas are recycled back to the gasifier via the organic phase and the contaminant steam.

* * * * *